US011966121B2

United States Patent
Chen et al.

(10) Patent No.: US 11,966,121 B2
(45) Date of Patent: Apr. 23, 2024

(54) ELECTRONIC WINDOW AND METHOD FOR FORMING THE SAME

(71) Applicant: InnoLux Corporation, Miao-Li County (TW)

(72) Inventors: En-Hsiang Chen, Miao-Li County (TW); Chih-Chin Kuo, Miao-Li County (TW); Mao-Shiang Lin, Miao-Li County (TW); Hsu-Kuan Hsu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/185,519

(22) Filed: Mar. 17, 2023

(65) Prior Publication Data
US 2023/0333429 A1 Oct. 19, 2023

Related U.S. Application Data

(60) Provisional application No. 63/331,359, filed on Apr. 15, 2022.

(30) Foreign Application Priority Data

Jan. 4, 2023 (CN) .......................... 202310006043.X (51) Int. Cl.
*G02F 1/1337* (2006.01)

(52) U.S. Cl.
CPC .. *G02F 1/133757* (2021.01); *G02F 1/133788* (2013.01)

(58) Field of Classification Search
CPC .................. G02F 1/133757; G02F 1/133788
USPC .......................................................... 349/16
See application file for complete search history.

(56) References Cited

U.S. PATENT DOCUMENTS

| 11,236,544 | B2 | 2/2022 | Kwon et al. |
| 2018/0011359 | A1* | 1/2018 | De Jong ............. G02F 1/13338 |
| 2020/0363666 | A1* | 11/2020 | Chi .................. G02F 1/133723 |
| 2023/0148148 | A1* | 5/2023 | Butler ....................... E06B 9/24 |
| | | | 349/56 |

* cited by examiner

*Primary Examiner* — Charles S Chang
(74) *Attorney, Agent, or Firm* — McClure, Qualey & Rodack, LLP (57) ABSTRACT

An electronic window is provided for adjusting light and includes a first panel, a second panel, and an intermediate layer. The first panel includes a first alignment layer. The second panel includes a second alignment layer. The intermediate layer is disposed between the first panel and the second panel. The angle of orientation of the first alignment layer is between 25 degrees and 65 degrees, and the angle of orientation of the second alignment layer is between 115 degrees and 155 degrees.

20 Claims, 5 Drawing Sheets

ELECTRONIC WINDOW AND METHOD FOR FORMING THE SAME

CROSS REFERENCE TO RELATED APPLICATIONS

This application claims priority of China Patent Application No. 202310006043.X, filed on Jan. 4, 2023, and claims the benefit of U.S. Provisional Application No. 63/331,359, filed on Apr. 15, 2022, the entirety of which are incorporated by reference herein.

BACKGROUND

Field of the Invention

The present invention relates to an electronic window and a method for forming the same, and, in particular, to an electronic window having multiple panels with different orientations and a method for forming the same.

Description of the Related Art

Thanks to technological developments, the use of electronic devices is very common nowadays. In particular, electronic windows have been adopted for use in buildings and vehicles to adjust light for satisfying users' demands. However, users may become conscious of unnatural brightness distribution on existing electronic windows. Therefore, there is still room for improvement of the current models.

BRIEF SUMMARY

An embodiment of the present invention provides an electronic window for adjusting light. The electronic window includes a first panel, a second panel, and an intermediate layer. The first panel includes a first alignment layer. The second panel includes a second alignment layer. The intermediate layer is disposed between the first panel and the second panel. The angle of orientation of the first alignment layer is between 25 degrees and 65 degrees, and the angle of orientation of the second alignment layer is between 115 degrees and 155 degrees.

An embodiment of the present invention provides an electronic window or adjusting light and including a first panel, a second panel, and an intermediate layer. The first panel includes two first alignment layers and a first liquid-crystal layer between the two first alignment layers. The orientations of the two first alignment layers are parallel to each other. The second panel includes two second alignment layers and a second liquid-crystal layer between the two second alignment layers. The orientations of the two second alignment layers are parallel to each other. The intermediate layer is disposed between the first panel and the second panel. The first liquid-crystal layer and the second liquid-crystal layer include a plurality of dichroic dye molecules and a plurality of liquid-crystal molecules, and the orientations of the two first alignment layers are perpendicular to the orientations of the two second alignment layers.

An embodiment of the present invention provides a method for forming an electronic window, including forming a first panel. Forming the first panel includes providing two first substrates, and forming a first alignment layer on each of the two first substrates. The method also includes forming a second panel. Forming the second panel includes providing two second substrates, and forming a second alignment layer on each of the two second substrates. The method includes flipping the two second substrates having the second alignment layer about an axis, so that the sum of the angle of the first orientation of the first alignment layers and the angle of the second orientation of the second alignment layers is 180 degrees. In addition, the method includes disposing an intermediate layer between the first panel and the second panel.

BRIEF DESCRIPTION OF THE DRAWINGS

The present invention can be more fully understood by reading the subsequent detailed description and examples with references made to the accompanying drawings, wherein.

DETAILED DESCRIPTION

The present disclosure may be understood by referring to the following description and the appended drawings. It should be noted that, in order to make the reader easy to understand and make the drawings concise, the drawings in the present disclosure may illustrate a part of the light-emitting unit, and specific elements in the drawings are not drawn based on the actual scale. In addition, the number and the size of each component in the drawings merely serves as an example, and are not intended to limit the scope of the present disclosure. Furthermore, similar and/or corresponding numerals may be used in different embodiments for describing some embodiments simply and clearly, but not represent any relationship between different embodiment and/or structures discussed below.

Certain terms may be used throughout the present disclosure and the appended claims to refer to particular elements. Those skilled in the art will understand that electronic device manufacturers may refer to the same components by different names. The present specification is not intended to distinguish between components that have the same function but different names. In the following specification and claims, the words "including", "comprising", "having" and the like are open words, so they should be interpreted as meaning "including but not limited to . . . ". Therefore, when terms "including", "comprising", and/or "having" are used in the description of the disclosure, the presence of corresponding features, regions, steps, operations and/or components is specified without excluding the presence of one or more other features, regions, steps, operations and/or components.

In addition, in this specification, relative expressions may be used. For example, "lower", "bottom", "higher" or "top" are used to describe the position of one element relative to another. It should be noted that if a device is flipped upside down, an element that is "lower" will become an element that is "higher".

When a corresponding component (such as a film layer or region) is referred to as "on another component", it may be directly on another component, or there may be other components in between. On the other hand, when a component is referred "directly on another component", there is no component between the former two. In addition, when a component is referred "on another component", the two components have an up-down relationship in the top view, and this component can be above or below the other component, and this up-down relationship depends on the orientation of the device.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

In the present disclosure, the thickness, length, and width can be measured by using an optical microscope, and the thickness can be measured by the cross-sectional image in the electron microscope, but it is not limited thereto. In addition, a certain error may be present in a comparison with any two values or directions. The terms "about," "equal to," "equivalent," "the same," "essentially" or "substantially" are generally interpreted as within 10% of a given value or range, or as interpreted as within 5%, 3%, 2%, 1%, or 0.5% of a given value or range.

The phrase "range between a first value and the second value" indicates that the aforementioned range includes the first value, the second value, and other values therebetween.

It should be noted that the technical solutions provided by different embodiments below may be interchangeable, combined or mixed to form another embodiment without departing from the spirit of the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Figure 1:
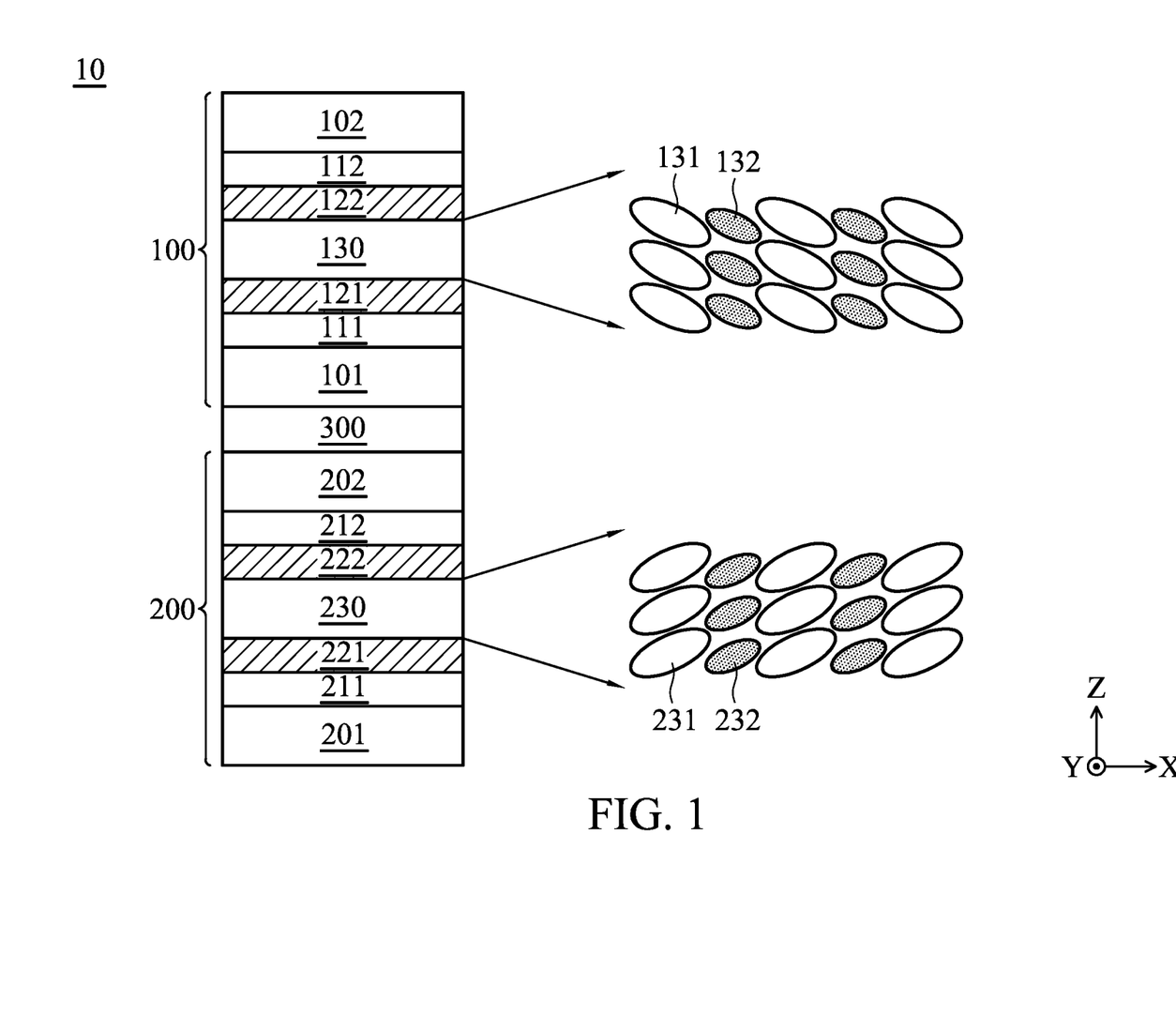
FIG. 1 shows a schematic view of an electronic window in accordance with some embodiments of the present disclosure.

FIG. 1 shows a partial plan view of an electronic window 10 in accordance with some embodiments of the present disclosure. In some embodiments, the electronic window 10 can be used in buildings or vehicles to adjust light, but the present disclosure is not limited thereto. In some embodiments, the electronic window 10 may be used in accompany with another electronic device (not shown). For example, the electronic device may include a display device, a backlight device, an antenna device, a sensing device or a splicing device, but the present disclosure is not limited thereto. The electronic device may be a bendable or flexible electronic device. The display device may be a non-self-luminous display device or a self-luminous display device. The antenna device may be a liquid-crystal type antenna device or a non-liquid-crystal type antenna device. The sensing device may be a sensing device for sensing capacitance, light, thermal energy or ultrasonic waves, but the present disclosure is not limited thereto. In some embodiments, the electronic device includes a flexible panel, and the flexible panel includes electronic components, and the electronic components may include passive components and active components, such as capacitors, resistors, inductors, diodes, transistors, and the like. In some embodiments, the diodes may include light-emitting diodes or photodiodes. The light-emitting diodes may, for example, include organic light-emitting diodes (OLEDs), mini LEDs, micro LEDs or quantum dot LEDs, but the present disclosure is not limited thereto. The splicing device may be, for example, a display splicing device or an antenna splicing device, but the present disclosure is not limited thereto. It should be noted that the electronic device may be any combination of the above-mentioned devices, but the present disclosure is not limited thereto. It should be understood that the content of the present disclosure will be discussed with respect to the partial structure of the electronic window 10 in the following paragraphs, and those skilled in the art should understand that the electronic window 10 may also include other structures to perform expected functions.

As shown in FIG. 1, the electronic window 10 may include a first panel 100, a second panel 200 and an intermediate layer 300. For example, the first panel 100 and the second panel 200 may be stacked in a direction (such as a direction that is parallel to the Z axis), and the intermediate layer 300 may be disposed between the first panel 100 and the second panel 200. However, the present disclosure is not limited thereto. In some embodiments, the first panel 100 may include two first substrates 101, 102, two first conductive layers 111, 112, two first alignment layers 121, 122, and a first liquid-crystal layer 130 between the first alignment layer 121 and the first alignment layer 122. The first conductive layer 111 and the first conductive layer 112 are disposed between the first substrate 101 and the first substrate 102, and the first alignment layer 121 and the first alignment layer 122 are disposed between the first conductive layer 111 and the first conductive layer 112. In some embodiments, the first substrate 101 is located on one side of the first alignment layers 121, 122, and the first substrate 102 is located on the other side of the first alignment layer 121, 122. The second substrate 201 is located on one side of the second alignment layers 221, 222, and the second substrate 202 is located on the other side of the second alignment layers 221, 222. The intermediate layer 300 is in contact with the first substrate 101 and the second substrate 202, but the present disclosure is not limited thereto. For example, the first substrate 101 and the first substrate 102 may include glass, polymer material or other suitable transparent materials, but the present disclosure is not limited thereto. For example, the first conductive layer 111 and the first conductive layer 112 may include metal or other suitable conductive materials, but the disclosure is not limited thereto.

In some embodiments, the first liquid-crystal layer 130 includes a plurality of liquid-crystal molecules 131 and a plurality of dichroic dye molecules 132. The dichroic dye molecules 132 can, for example, absorb specific wavelengths of visible light to achieve the light-shielding effect. In some embodiments, the angle between the orientations of the first alignment layer 121 and the first alignment layer 122 is between 25 degrees and 65 degrees, so that the liquid-crystal layer 130 disposed between the first alignment layer 121 and the first alignment layer 122 is arranged at the angle of orientation. In some embodiments, the respective orientations and angles of the first alignment layer 121 and the first alignment layer 122 are parallel to each other. The definitions of the orientations and the angles of the first alignment layer 121 and the first alignment layer 122 will be further described below with reference to FIG. 4.

Similarly, the second panel 20 may include two second substrates 201, 202, two second conductive layers 211, 212, two second alignment layers 221, 222 and a liquid-crystal layer 230 between the second alignment layer 221 and the second alignment layer 222. The second conductive layer 211 and the second conductive layer 212 are disposed between the second substrate 201 and the second substrate 202, and the second alignment layer 221 and the second alignment layer 222 are disposed between the second conductive layer 211 and the second conductive layer 212. For example, the second substrate 201 and the second substrate 202 may include glass, polymer material or other suitable transparent materials, but the present disclosure is not limited thereto. For example, the second conductive layer 211 and the second conductive layer 212 may include metal or other suitable conductive materials, but the present disclosure is not limited thereto.

In some embodiments, the second liquid-crystal layer 230 includes a plurality of liquid-crystal molecules 231 and a plurality of dichroic dye molecules 232. Similarly, the dichroic dye molecules 232 can, for example, absorb specific wavelengths of visible light to achieve the light-shielding effect. The operation of the liquid-crystal molecules 231 and the dichroic dye molecules 232 will be further described below with reference to FIG. 2A and FIG. 2B. In some embodiments, the angle of orientation of the second alignment layer 221 and the second alignment layer 222 is between 115 degrees and 155 degrees, so that the liquid-crystal layer 230 disposed between the second alignment layer 221 and the second alignment layer 222 is arranged at the angle of orientation. In some embodiments, the respective orientations of the second alignment layer 221 and the second alignment layer 222 are parallel to each other. The definition of the orientations and angles of the second alignment layer 221 and the second alignment layer 222 will be further described below with reference to FIG. 4

In addition, the intermediate layer 300 disposed between the first panel 100 and the second panel 200 may contact the first substrate 101 and the second substrate 202. For example, the intermediate layer 300 may include a dielectric layer (such as optical clear adhesive (OCA)), a vacuum space, a space filled with a liquid (such as water), a space filled with a gas (such as nitrogen (N$_2$), oxygen (O$_2$), etc.), or a combination thereof, but the present disclosure is not limited thereto. By arranging the first panel 100 and the second panel 200 with different orientations, the light passing through the electronic window 10 can have a more uniform brightness distribution, providing users with a more natural visual experience. Alternatively, the above-mentioned configuration can improve the error tolerance of installing the first panel 100 and the second panel 200 of the electronic window 10, even if the first panel 100 and the second panel 200 are installed in a manner that is not originally designed, relatively uniform light distribution can be still obtained, reducing the probability that the user notices the uneven light.

Figure 2A:
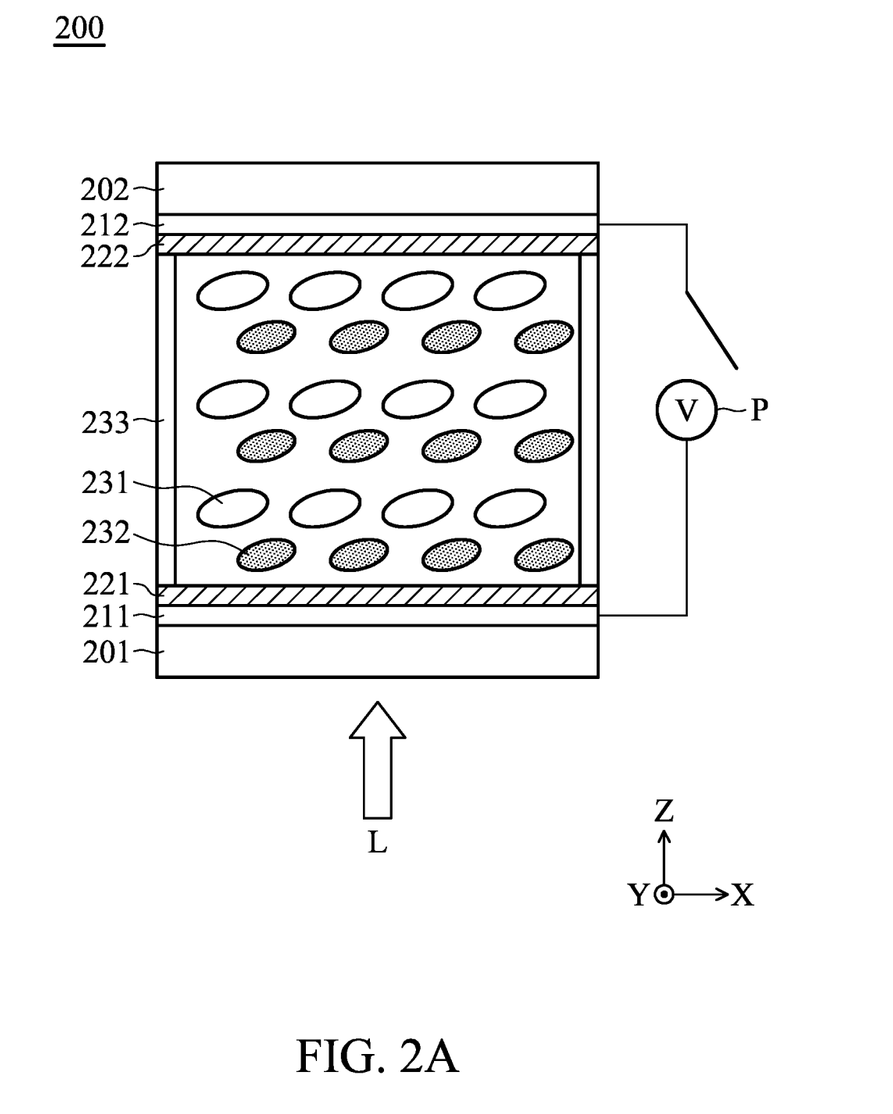
FIG. 2A shows a schematic view of a second panel in accordance with some embodiments of the present disclosure.

FIG. 2A shows a schematic view of the second panel 200 in accordance with some embodiments of the present disclosure. As shown in FIG. 2A, the second panel 200 (such as the second conductive layer 211 and the second conductive layer 212) can form a switchable circuit with the power source P. The liquid-crystal molecules 231 in the sealing layer 233 is rotatable according to the difference in electrical properties, and then drive the dichroic dye molecules 232 to change their orientation, so that the second panel 200 can absorb at least a portion of the incident light L or allow the light L to pass through the second panel 200. Specifically, in this embodiment, an open circuit is formed between the power supply P and the second panel 200, so that the rotation of the liquid-crystal molecules 231 drives the dichroic dye molecules 232 to change their orientation. At this time, the second panel 200 will absorb at least a portion of the incident light L, thereby reducing the amount of the light L passing through the second panel 200.

Figure 2B:
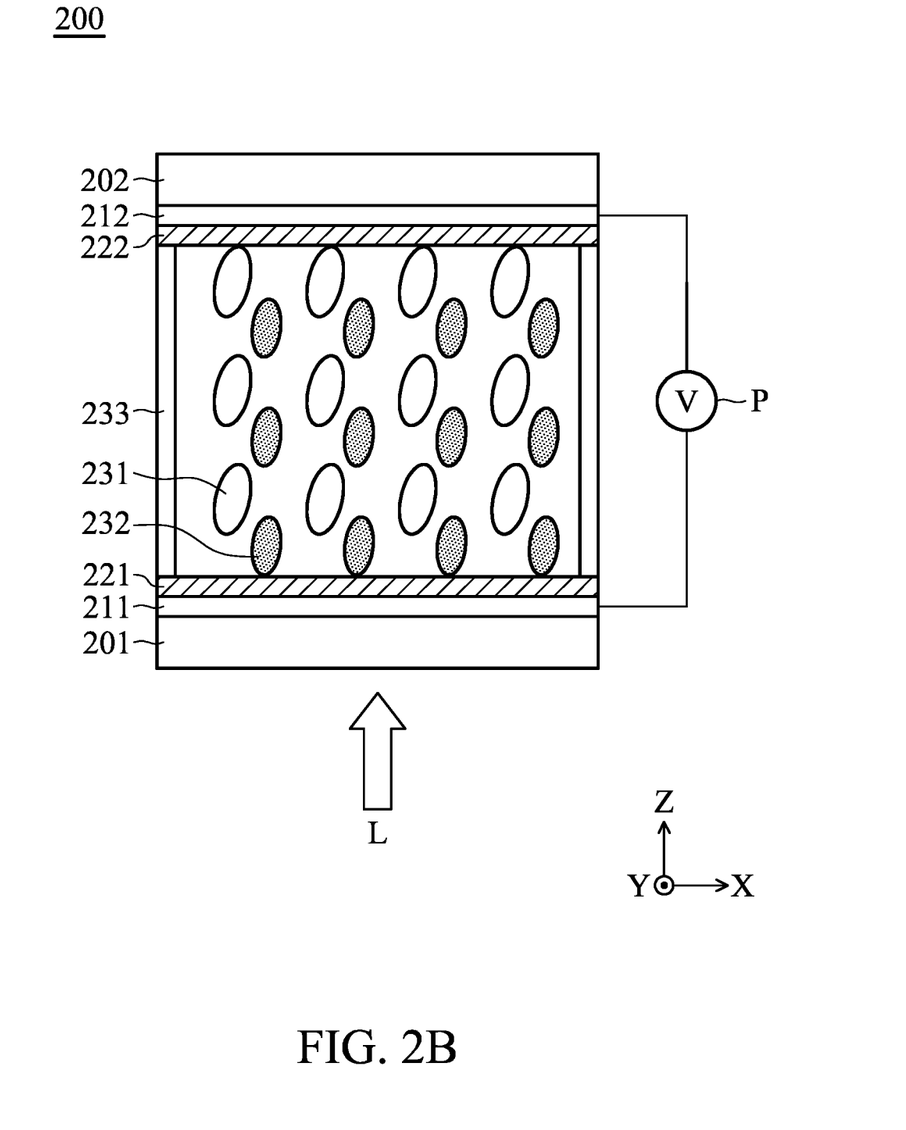
FIG. 2B shows a schematic view of the second panel in accordance with some embodiments of the present/disclosure.

FIG. 2B shows a schematic view of the second panel 200 in accordance with some embodiments of the present disclosure. As shown in FIG. 2B, a closed circuit is formed between the power supply P and the second panel 200, so that the rotation of the liquid-crystal molecules 231 drives the dichroic dye molecules 232 to change their orientation. At this time, the light L can pass through the second panel 200 and is barely absorbed by the second panel 200. As set forth above, by switching the circuit formed between the power supply P and the second panel 200, the light transmittance of the second panel 200 is changeable. It should be understood that although the above-mentioned embodiment is described with the second panel 200 as an example, the first panel 100 can also be operated in the same way, and will not be described in detail below.

Figure 3:
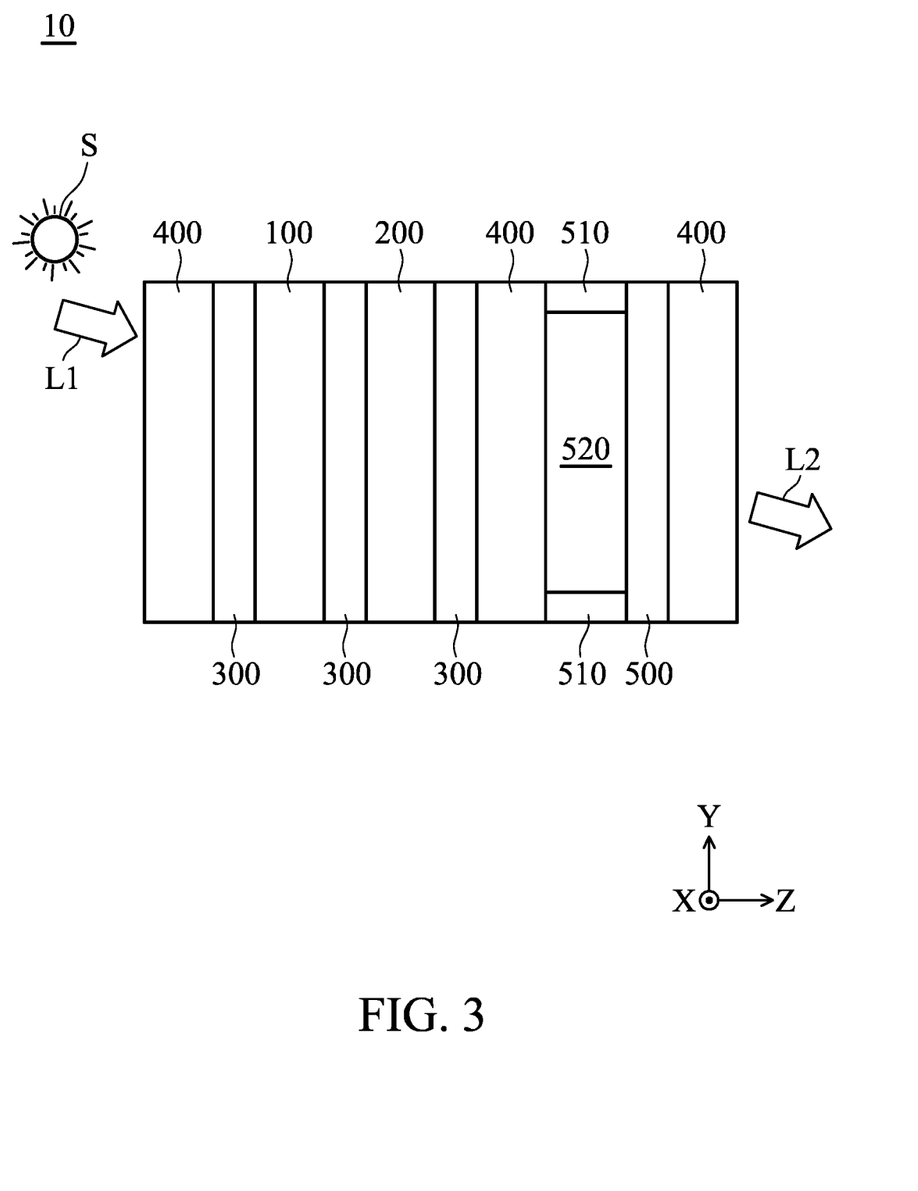
FIG. 3 shows a schematic view of the electronic window in accordance with some embodiments of the present disclosure.

FIG. 3 shows a schematic view of the electronic window 10 in accordance with some embodiments of the present disclosure. As shown in FIG. 3, the electronic window 10 further includes a plurality of transparent substrates 400. In some embodiments, the transparent substrates 400 may be attached to the first panel 100 or the second panel 200 via the intermediate layer 300 (for example, a dielectric layer). For example, the transparent substrate 400 may include glass or other suitable light-transmitting materials, but the present disclosure is not limited thereto. In addition, in some embodiments, the electronic window 10 further includes a low-emissivity (low-E) layer 500 that is disposed between different transparent substrates 400. For example, the low-emissivity layer 500 may be an optical film with relatively high reflectivity. For example, by partially reflecting the light L1 emitted from the light source S, the heat energy caused by the radiation of the light source S can be reduced from entering the target.

In some embodiments, the electronic window 10 further includes a housing 510. The housing 510 may form a space 520 with the low-E layer 500 and the transparent substrates 400. In some embodiments, argon (Ar) may be filled in the space 520. In this way, the heat energy brought by the incident light L1 may be further blocked. For example, the material of the housing 510 may include metal or other suitable rigid materials, but the present disclosure is not limited thereto. It should be understood that this embodiment is merely an example, and those skilled in the art may add, omit, or change the configuration of the above-mentioned film layers according to the content of the present disclosure, and these configurations are all within the scope of the present disclosure.

Figure 4:
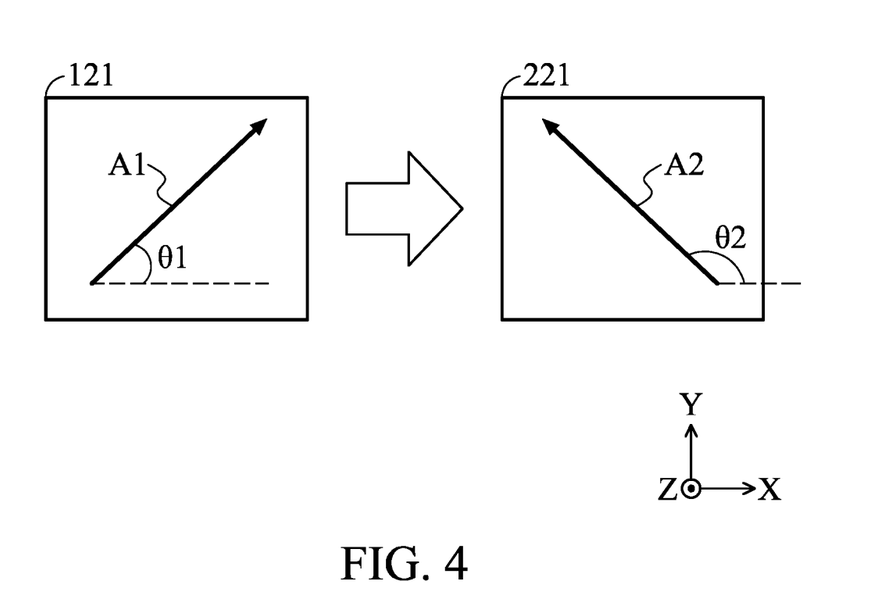
FIG. 4 shows a plan view of a first alignment layer and a second alignment layer in accordance with some embodiments of the present disclosure.

FIG. 4 shows a schematic plan view of the first alignment layer 121 and the second alignment layer 221 according to some embodiments of the present disclosure. As shown in FIG. 4, the first alignment layer 121 (which can also be used as the first alignment layer 122) has a first orientation A1. More specifically, a plurality of grooves (not shown) extending in the first orientation A1 may be formed on the first alignment layer 121 to accommodate liquid-crystal molecules 131 and dichroic dye molecules 132 of the first liquid-crystal layer 130 (as shown in FIG. 1). The first orientation A1 has an angle of θ1, wherein the angle θ1 may be an included angle between the first orientation A1 and the positive X-axis. In some embodiments, the angle θ1 may be between about 25 degrees and about 65 degrees, such as about 45 degrees. After forming the first orientation A1 of the first alignment layers 121, 122, the first liquid-crystal layer 130 may be formed between the first alignment layers 121, 122, and the first alignment layers 121, 122 and the first conductive layer 111, 112 are disposed between the two first substrates 101, 102.

In some embodiments, the alignment layer having the first orientation A1 may be formed on two second substrates 201, 202, and the two second substrates 201, 202 with the alignment layer having the first orientation A1 are flipped in an axial direction (such as the X-axis or the Y-axis), and the second alignment layers 221, 222 with the second orientation A2 are therefore formed on the two second substrates 201, 202. In this way, the manufacturing process of the two alignment layers 221 and 222 is simplified and the manufacturing time and cost are reduced. The second orientation A2 has an angle of θ2, wherein the angle θ2 may be an included angle between the second alignment direction A2 and the positive X-axis. In some embodiments, the angle θ2 may be between about 115 degrees and about 155 degrees, such as about 135 degrees. Through the above process, the first alignment layers 121, 122 are formed on the first substrates 101, 102, and the second alignment layers 221, 222 are formed on the second substrates 201, 202, so that the sum of the angle θ1 of the first orientation A1 and the angle θ2 of the second orientation A2 is 180 degrees. In some embodiments, the first orientation A1 of the first alignment layer 121 is substantially perpendicular to the second orientation A2 of the second alignment layer 221. However, the present disclosure is not limited thereto. In some embodiments, the second alignment layers 221, 222 may be formed in the same manner as the first alignment layers 121, 122, which will not be described in detail below.

As set forth above, the embodiments of the present disclosure provide an electronic window including multiple panels with different orientations and a manufacturing method thereof. With the above features, the light passing through the electronic window may have a more uniform brightness distribution, providing users with a more natural visual experience. Alternatively, the above configuration may improve the error tolerance of installing the first panel and the second panel of the electronic window. Even if the first panel and the second panel are installed in a way that is not originally designed, a relatively uniform light distribution may still be obtained, which reduces the probability that users are aware of the unevenly-distributed light. In addition, by setting a low-emissivity layer in the electronic window, the effect of heat insulation may be further achieved.

While the embodiments and the advantages of the present disclosure have been described above, it should be understood that those skilled in the art may make various changes, substitutions, and alterations to the present disclosure without departing from the spirit and scope of the present disclosure. It should be noted that different embodiments may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An electronic window for adjusting light, comprising:
a first panel comprising a first alignment layer;
a second panel comprising a second alignment layer; and
an intermediate layer disposed between the first panel and the second panel,
wherein an angle of orientation of the first alignment layer is between 25 degrees and 65 degrees, and an angle of orientation of the second alignment layer is between 115 degrees and 155 degrees.

2. The electronic window as claimed in claim 1, wherein the orientation of the first alignment layer is substantially perpendicular to the orientation of the second alignment layer.

3. The electronic window as claimed in claim 2, wherein the first panel comprises a first substrate and a first liquid-crystal layer, the second panel comprises a second substrate and a second liquid-crystal layer, and the intermediate layer is in contact with the first substrate and the second substrate.

4. The electronic window as claimed in claim 3, wherein the first liquid-crystal layer and the second liquid-crystal layer comprise a plurality of liquid-crystal molecules and a plurality of dichroic dye molecules.

5. The electronic window as claimed in claim 2, wherein the intermediate layer comprises a first dielectric layer or a space filled with gas.

6. The electronic window as claimed in claim 2, further comprising a first transparent substrate and a second dielectric layer disposed between the first transparent substrate and the first panel.

7. The electronic window as claimed in claim 5, further comprising a low-radiation layer and a second transparent substrate, wherein the low-radiation layer is disposed between the first transparent substrate and the second transparent substrate.

8. The electronic window as claimed in claim 7, further comprising a housing disposed adjacent to the low-radiation layer, wherein a space is formed by the low-radiation layer, the housing, and either of the first transparent substrate or the second transparent substrate.

9. The electronic window as claimed in claim 8, wherein argon is filled in the space.

10. An electronic window for adjusting light, comprising:
a first panel comprising two first alignment layers and a first liquid-crystal layer between the two first alignment layers, wherein orientations of the two first alignment layers are parallel to each other, and an acute angle is formed between the orientations of the two first alignment layers and an edge of the two first alignment layers;
a second panel comprising two second alignment layers and a second liquid-crystal layer between the two second alignment layers, wherein orientations of the two second alignment layers are parallel to each other; and an intermediate layer disposed between the first panel and the second panel, wherein the first liquid-crystal layer and the second liquid-crystal layer comprise a plurality of dichroic dye molecules and a plurality of liquid-crystal molecules, and the orientations of the two first alignment layers are perpendicular to the orientations of the two second alignment layers.

11. The electronic window as claimed in claim 10, wherein an angle of orientation of the first alignment layers is between 25 degrees and 65 degrees, and an angle of orientation of the second alignment layers is between 115 degrees and 155 degrees.

12. The electronic window as claimed in claim 10, wherein the first panel comprises a first substrate, the second panel comprises a second substrate, the intermediate layer is in contact with the first substrate and the second substrate, and the intermediate layer comprises a dielectric layer or a space filled with gas.

13. A method for forming an electronic window, comprising:
    forming a first panel, comprising:
    providing two first substrates; and
    forming a first alignment layer on each of the two first substrates;
    forming a second panel, comprising:
    providing two second substrates; and
    forming a second alignment layer on each of the two second substrates;
    flipping the two second substrates having the second alignment layer about an axis, so that a sum of an angle of a first orientation of the first alignment layers and an angle of a second orientation of the second alignment layers is 180 degrees; and
    disposing an intermediate layer between the first panel and the second panel.

14. The method as claimed in claim 13, wherein the angle of the first orientation of the first alignment layers is between 25 degrees and 65 degrees.

15. The method as claimed in claim 13, wherein the intermediate layer comprises a dielectric layer or a space filled with gas.

16. The method as claimed in claim 13, wherein forming the first panel comprises forming a first liquid-crystal layer on the first alignment layer, and the first liquid-crystal layer comprises a plurality of liquid-crystal molecules and a plurality of dichroic dye molecules.

17. The method as claimed in claim 13, wherein forming the second panel comprises forming a second liquid-crystal layer on the second alignment layer, and the second liquid-crystal layer comprises a plurality of liquid-crystal molecules and a plurality of dichroic dye molecules.

18. The method as claimed in claim 13, wherein disposing the intermediate layer between the first panel and the second panel comprises contacting the intermediate layer with one of the two first substrates and one of the two second substrates.

19. The method as claimed in claim 13, further comprising:
    disposing a dielectric layer on the first panel;
    disposing a transparent substrate on the dielectric layer;
    disposing a housing on the transparent substrate; and
    disposing a low-radiation layer on the housing, wherein a space is formed by the low-radiation layer, the housing, and the transparent substrate.

20. The method as claimed in claim 19, further comprising filling argon in the space.

* * * * *